(12) United States Patent
Welton et al.

(10) Patent No.: US 7,960,315 B2
(45) Date of Patent: *Jun. 14, 2011

(54) TREATMENT FLUIDS COMPRISING DIUTAN AND ASSOCIATED METHODS

(75) Inventors: Thomas D. Welton, Duncan, OK (US); Richard W. Pauls, Duncan, OK (US); Lulu Song, Duncan, OK (US); Jason E. Bryant, Duncan, OK (US); Sean R. Beach, Duncan, OK (US); Ian D. Robb, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 1006 days.

This patent is subject to a terminal disclaimer.

(21) Appl. No.: 11/704,009

(22) Filed: Feb. 8, 2007

(65) Prior Publication Data
US 2008/0194427 A1    Aug. 14, 2008

(51) Int. Cl.
*C09K 8/58* (2006.01)

(52) U.S. Cl. ........ 507/240; 507/209; 507/213; 507/244; 507/256; 507/261; 507/263; 507/266; 507/267; 507/269

(58) Field of Classification Search ............ None
See application file for complete search history.

(56) References Cited

U.S. PATENT DOCUMENTS

| | | | |
|---|---|---|---|
| 3,145,776 A * | 8/1964 | Pittman | 166/55 |
| 5,175,278 A | 12/1992 | Peik et al. | 536/123 |
| 5,361,856 A | 11/1994 | Surjaatmadja et al. | 175/67 |
| 5,413,178 A | 5/1995 | Walker et al. | 166/300 |
| 5,494,103 A | 2/1996 | Surjaatmadja et al. | 166/222 |
| 5,582,249 A | 12/1996 | Caveny et al. | 166/276 |
| 5,759,964 A | 6/1998 | Shuchart et al. | 507/209 |
| 5,765,642 A | 6/1998 | Surjaatmadja | 166/297 |
| 5,775,425 A | 7/1998 | Weaver et al. | 166/276 |
| 5,787,986 A | 8/1998 | Weaver et al. | 166/280 |
| 5,833,000 A | 11/1998 | Weaver et al. | 166/276 |
| 5,853,048 A | 12/1998 | Weaver et al. | 166/279 |
| 6,024,171 A * | 2/2000 | Montgomery et al. | 166/308.1 |
| 6,110,271 A | 8/2000 | Skaggs et al. | 106/804 |
| 6,547,871 B2 | 4/2003 | Chatterji et al. | 106/672 |
| 6,632,779 B1 | 10/2003 | Vollmer et al. | 507/211 |

(Continued)

FOREIGN PATENT DOCUMENTS

EP      0520775 A1    6/1992

(Continued)

OTHER PUBLICATIONS

Office Action from U.S. Appl. No. 11/704,121 mailed Nov. 13, 2008.

(Continued)

*Primary Examiner* — John J Figueroa
(74) *Attorney, Agent, or Firm* — Robert A. Kent; McDermott, Will & Emery LLP

(57) ABSTRACT

Methods are provided that include a method comprising providing a acidic treatment fluid that comprises a base fluid, an acid composition, and a gelling agent that comprises clarified diutan; and introducing the acidic treatment fluid into at least a portion of a subterranean formation. In some embodiments, the acidic treatment fluid may be allowed to interact with a component of the subterranean formation so that the component is at least partially dissolved. In some embodiments, the acidic treatment fluid may be introduced into a pipeline. Additional methods are also provided.

29 Claims, 3 Drawing Sheets

U.S. PATENT DOCUMENTS

| | | | |
|---|---|---|---|
| 6,668,926 B2 | 12/2003 | Nguyen et al. | 166/280 |
| 6,729,404 B2 | 5/2004 | Nguyen et al. | 166/280.2 |
| 6,877,563 B2 | 4/2005 | Todd et al. | 166/312 |
| 6,962,200 B2 | 11/2005 | Nguyen et al. | 166/280.2 |
| 7,021,383 B2 | 4/2006 | Todd et al. | 166/307 |
| 7,131,491 B2 | 11/2006 | Blauch et al. | 166/276 |
| 7,159,659 B2 | 1/2007 | Welton et al. | 166/307 |
| 7,275,596 B2 * | 10/2007 | Willberg et al. | 166/280.1 |
| 7,318,474 B2 | 1/2008 | Welton et al. | |
| 7,547,665 B2 * | 6/2009 | Welton et al. | 507/213 |
| 7,584,791 B2 * | 9/2009 | Robb et al. | 166/279 |
| 2003/0166472 A1 | 9/2003 | Pursley et al. | 507/200 |
| 2005/0261138 A1 * | 11/2005 | Robb et al. | 507/209 |
| 2006/0121578 A1 * | 6/2006 | Bower et al. | 435/85 |
| 2006/0131012 A1 | 6/2006 | Blauch et al. | 166/249 |
| 2006/0166836 A1 | 7/2006 | Pena et al. | 507/211 |
| 2006/0166837 A1 | 7/2006 | Lin et al. | 507/211 |
| 2006/0178276 A1 | 8/2006 | Pena et al. | 507/211 |
| 2006/0180309 A1 | 8/2006 | Welton et al. | 166/282 |
| 2006/0180310 A1 | 8/2006 | Welton et al. | 166/283 |
| 2006/0183646 A1 | 8/2006 | Welton et al. | 507/259 |
| 2006/0199201 A1 | 9/2006 | Harding et al. | 435/6 |
| 2006/0243449 A1 | 11/2006 | Welton et al. | 166/307 |
| 2006/0247135 A1 | 11/2006 | Welton et al. | 507/213 |
| 2007/0281868 A1 | 12/2007 | Pauls et al. | |
| 2008/0194428 A1 | 8/2008 | Welton et al. | |
| 2008/0194430 A1 | 8/2008 | Welton et al. | |

FOREIGN PATENT DOCUMENTS

| | | |
|---|---|---|
| GB | 1 304 002 A | 1/1973 |
| WO | WO 01/64897 A2 | 9/2001 |
| WO | WO 2006/117517 A2 | 11/2006 |

OTHER PUBLICATIONS

SPE 64982 entitled New Biopolymers for Drilling, Drill-In, Completions, Spacer, and Coil-Tubing Fluids, Part II by Navarrete, Seheult and Coffey (XP-002480231) pp. 1-15, 2001.

Search Report and Written Opinion of International Application No. PCT/GB2008/000474 Feb. 8, 2008.

Office action dated Mar. 10, 2008 from U.S. Appl. No. 11/704,121.

Diltz, et al., "Location of O-acetyl groups in S-657 using the reductive-cleavage method," Carbohydrate Research 331 (2001), pp. 265-270.

Eoff, et al., "Development of a Hydrophobically Modified Water-Soluble Polyumer as a Selective Bullhead System for Water-Production Problems," SPE 80206, pp. 1-9, 2003.

Chowdhury, et al., "Structural Studies of an extracellular polysaccharide, S-657, elaborated by *Xanthomonas* ATCC 53159," Carbohydrate Research, 164 (1987), pp. 117-122.

Lee, et al., "X-Ray and computer modeling studies on gellan-related polymers: Molecular structures of welan, S-657, and rhamsan," Carbohydrate Research, 214 (1991), pp. 11-24, 1991.

U.S. Appl. No. 11/418,617, filed May 16, 2006, Griffin, et al.

U.S. Appl. No. 11/502,656, filed Aug. 11, 2006, Welton, et al.

U.S. Appl. No. 11/506,703, filed Aug. 18, 2006, Middaugh, et al.

Office Action for U.S. Appl. No. 11,704,598 dated Apr. 2, 2010.

Official Communication for European Patent Application No. 08709370.4 dated Jun. 24, 2010.

Office Action for U.S. Appl. No. 11/704,598 dated Aug. 12, 2010.

Notice of Allowance and Notice of Allowability for U.S. Appl. No. 11/704,598 dated Jan. 25, 2011.

* cited by examiner

TREATMENT FLUIDS COMPRISING DIUTAN AND ASSOCIATED METHODS

CROSS-REFERENCE TO RELATED APPLICATIONS

The present invention is related to U.S. Patent Application Publication Nos. 2008/0194428 and 2008/0194430, respectively, both entitled "Treatment Fluids Comprising Diutan and Associated Methods," filed on Feb. 8, 2007, the entire disclosures of which are incorporated herein by reference.

BACKGROUND

The present invention relates to methods and compositions for use in industrial, oilfield, and/or subterranean operations. More particularly, the present invention relates to treatment fluids comprising clarified diutan gelling agents, and their use in industrial, oilfield, geothermal, coal, coal bed methane, and/or subterranean operations.

Treatment fluids may be used in a variety of subterranean treatments, including, but not limited to, stimulation treatments, damage removal, formation isolation, wellbore cleanout, scale removal, scale control, drilling operations, cementing, conformance treatments, and sand control treatments. Treatment fluids may also be used in a variety of pipeline treatments. As used herein, the term "treatment," or "treating," refers to any operation that uses a fluid in conjunction with a desired function and/or for a desired purpose. The term "treatment," or "treating," does not imply any particular action by the fluid or any particular component thereof.

One common production stimulation operation that employs a treatment fluid is hydraulic fracturing. Hydraulic fracturing operations generally involve pumping a treatment fluid (e.g., a fracturing fluid) into a well bore that penetrates a subterranean formation at a sufficient hydraulic pressure to create or enhance one or more cracks, or "fractures," in the subterranean formation. "Enhancing" one or more fractures in a subterranean formation, as that term is used herein, is defined to include the extension or enlargement of one or more natural or previously created fractures in the subterranean formation. The treatment fluid may comprise particulates, often referred to as "proppant particulates," that are deposited in the fractures. The proppant particulates, inter alia, may prevent the fractures from fully closing upon the release of hydraulic pressure, forming conductive channels through which fluids may flow to the well bore. The proppant particulates also may be coated with certain types of materials, including resins, tackifying agents, and the like, among other purposes, to enhance conductivity (e.g., fluid flow) through the fractures in which they reside. Once at least one fracture is created and the proppant particulates are substantially in place, the treatment fluid may be "broken" (i.e., the viscosity of the fluid is reduced), and the treatment fluid may be recovered from the formation.

Other common production stimulation operations that employ treatment fluids are acidizing operations. Where the subterranean formation comprises acid-soluble components, such as those present in carbonate and sandstone formations, stimulation and/or damage removal is often achieved by contacting the formation with a treatment fluid that comprises an acid. For example, where hydrochloric acid contacts and reacts with calcium carbonate in a formation, the calcium carbonate is consumed to produce water, carbon dioxide, and calcium chloride. After acidization is completed, the water and salts dissolved therein may be recovered by producing them to the surface (e.g., "flowing back" the well), leaving a desirable amount of voids (e.g., wormholes) within the formation, which may enhance the formation's permeability and/or increase the rate at which hydrocarbons subsequently may be produced from the formation. One method of acidizing known as "fracture acidizing" comprises injecting a treatment fluid that comprises an acid into the formation at a pressure sufficient to create or enhance one or more fractures within the subterranean formation. Another method of acidizing known as "matrix acidizing" comprises injecting a treatment fluid that comprises an acid into the formation at a pressure below that which would create or enhance one or more fractures within the subterranean formation.

Treatment fluids are also utilized in sand control treatments, such as gravel packing. In "gravel-packing" treatments, a treatment fluid suspends particulates (commonly referred to as "gravel particulates"), and deposits at least a portion of those particulates in a desired area in a well bore, e.g., near unconsolidated or weakly consolidated formation zones, to form a "gravel pack," which is a grouping of particulates that are packed sufficiently close together so as to prevent the passage of certain materials through the gravel pack. This "gravel pack" may, inter alia, enhance sand control in the subterranean formation and/or prevent the flow of particulates from an unconsolidated portion of the subterranean formation (e.g., a propped fracture) into a well bore. One common type of gravel-packing operation involves placing a sand control screen in the well bore and packing the annulus between the screen and the well bore with the gravel particulates of a specific size designed to prevent the passage of formation sand. The gravel particulates act, inter alia, to prevent the formation sand from occluding the screen or migrating with the produced hydrocarbons, and the screen acts, inter alia, to prevent the particulates from entering the well bore. The gravel particulates also may be coated with certain types of materials, including resins, tackifying agents, and the like, among other purposes, to enhance conductivity (e.g., fluid flow) through the gravel pack in which they reside. Once the gravel pack is substantially in place, the viscosity of the treatment fluid may be reduced to allow it to be recovered. In some situations, fracturing and gravel-packing treatments are combined into a single treatment (commonly referred to as "FracPac™"operations). In such "frac pack" operations, the treatments are generally completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

Maintaining sufficient viscosity in the treatment fluids used in these operations is important for a number of reasons. Maintaining sufficient viscosity is important in fracturing and sand control treatments for particulate transport and/or to create or enhance fracture width. Also, maintaining sufficient viscosity may be important in acid treatments, in friction reduction and to control and/or reduce fluid loss into the formation. Moreover, a treatment fluid of a sufficient viscosity may be used to divert the flow of fluids present within a subterranean formation (e.g., formation fluids, other treatment fluids) to other portions of the formation, for example, by invading the higher permeability portions of the formation with a fluid that has high viscosity at low shear rates. To further increase the viscosity of a treatment fluid, often the molecules of the gelling agent are "crosslinked" with the use of a crosslinking agent. Conventional crosslinking agents usually comprise a metal complex or compound that interacts with at least two polymer molecules to form a "crosslink" between them.

To provide the desired viscosity, polymeric gelling agents commonly are added to the treatment fluids. Examples of commonly used polymeric gelling agents include, but are not limited to, biopolymers, polysaccharides such as guar gums and derivatives thereof, cellulose derivatives, synthetic polymers, and the like. These gelling agents, when hydrated and at a sufficient concentration, are capable of forming a viscous solution. When used to make an aqueous-based viscosified treatment fluid, a gelling agent is combined with an aqueous fluid and the soluble portions of the gelling agent are dissolved in the aqueous fluid, thereby increasing the viscosity of the fluid. However, the insoluble portions of the gelling agents (referred to herein as "residue"), such as proteins, cellulose and fibers, remain in the aqueous fluid and enter the pores of the subterranean zones being treated as well as gravel packs and proppant packs in the zones. The presence of this residue may impair the producing capabilities and/or the permeability of the subterranean formation and is therefore undesirable.

In addition, although certain viscosified treatment fluids may be desirable because of their advantageous properties, such as sand transport properties, long-lasting viscosity, desirable sheer thinning characteristics, and efficient breaking properties, it may not be practicable to use such gelling agents if the aqueous base fluid is a brine. The term "brine" as used herein refers to various salts and salt mixtures dissolved in aqueous fluids. For example, when a brine is used in conjunction with certain gelling agents, the insoluble portions of the gelling agents may agglomerate in the presence of certain salts, such as potassium chloride, thereby making it difficult to achieve the desired viscosity. Furthermore, the agglomeration of insoluble portions of the gelling agent may also prevent effective filtration of the viscosified fluid.

SUMMARY

The present invention relates to methods and compositions for use in industrial, oilfield, and/or subterranean operations. More particularly, the present invention relates to treatment fluids comprising clarified diutan gelling agents, and their use in industrial, oilfield, geothermal, coal, coal bed methane, and/or subterranean operations.

In one embodiment, the present invention provides a method comprising providing a acidic treatment fluid that comprises a base fluid, an acid composition, and a gelling agent that comprises clarified diutan; and introducing the acidic treatment fluid into at least a portion of a subterranean formation.

In another embodiment, the present invention provides a method comprising providing a acidic treatment fluid that comprises a base fluid, an acid composition, and a gelling agent that comprises clarified diutan; contacting a portion of a subterranean formation with the acidic treatment fluid; and allowing the acidic treatment fluid to interact with a component of the subterranean formation so that the component is at least partially dissolved.

In another embodiment, the present invention provides a method comprising providing a acidic treatment fluid that comprises a base fluid, an acid composition, and a gelling agent that comprises clarified diutan; and introducing the treatment fluid into a pipeline.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
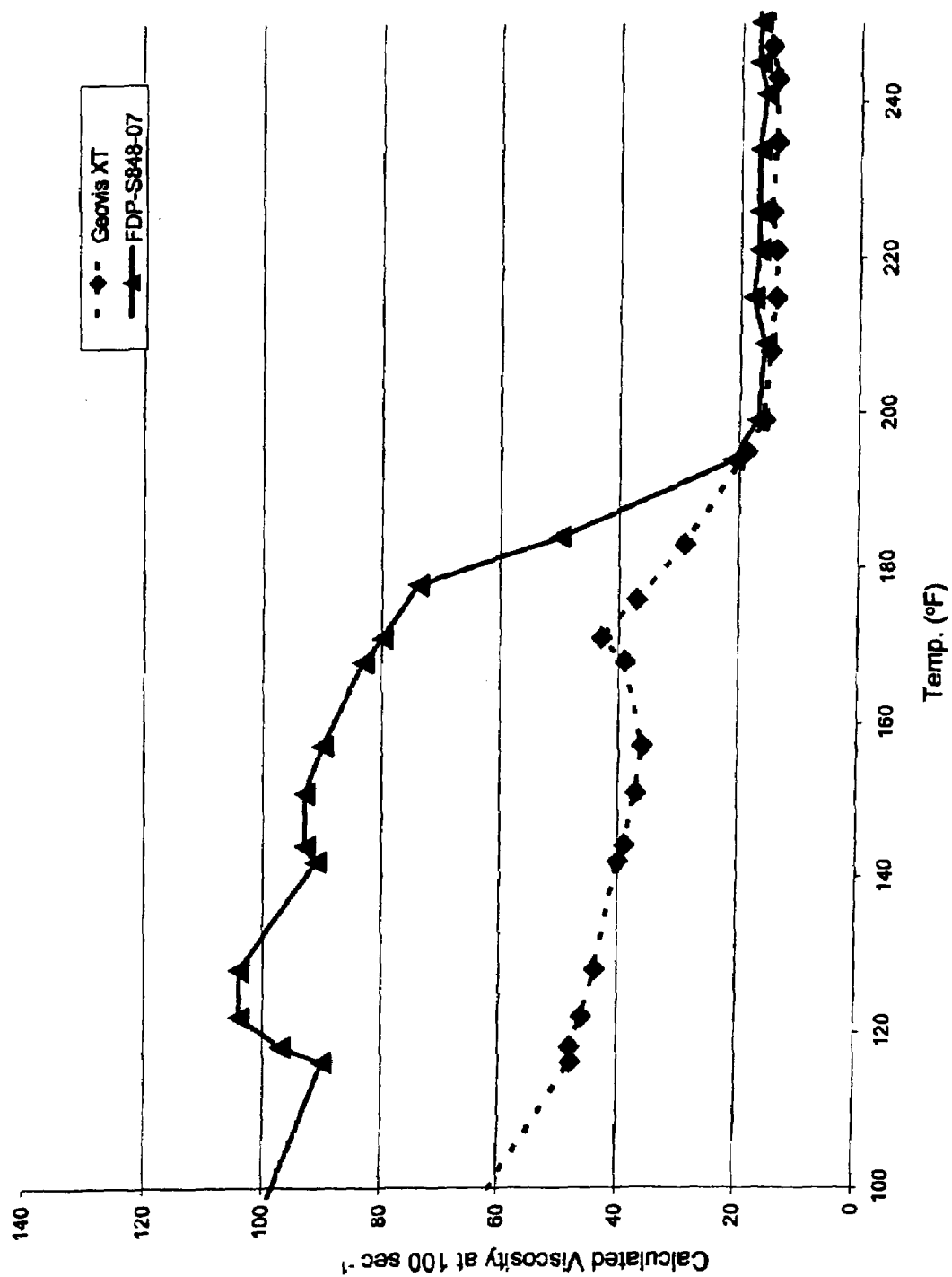
FIG. 1 illustrates the rheological properties of a treatment fluid of the present invention.

The present invention relates to methods and compositions for use in industrial, oilfield, and/or subterranean operations. More particularly, the present invention relates to treatment fluids comprising clarified diutan gelling agents, and their use in industrial, oilfield, geothermal, coal, coal bed methane, and/or subterranean operations.

While the compositions and methods of the present invention may be suitable for use in a variety of subterranean treatments, they may be particularly useful in treatments for subterranean formations comprising elevated temperatures, such as those above 200° F. One of the many advantages of the treatment fluids of the present invention is that they may comprise decreased levels of residue as compared to traditional viscosified treatment fluids. In some embodiments, the treatment fluids of the present invention may also provide excellent particulate suspension and transport properties at temperatures above 200° F. In addition, the treatment fluids of the present invention may also provide advantages over traditional viscosified treatment fluids in that they may provide enhanced filtration properties, better permeability regain and/or an increased rate of hydration.

The treatment fluids of the present invention generally comprise a base fluid and a gelling agent that comprises clarified diutan. The term "clarified diutan" as used herein refers to a diutan that has improved turbidity and/or filtration properties as compared to nonclarified diutan. In some embodiments, suitable clarified diutans may have been treated with enzymes or the like to remove residual cellular structures, such as cell walls. In some embodiments, suitable clarified diutans may be produced from genetically modified or bioengineered strains of bacteria or other strains of bacteria that allow the clarified diutan to have improved functional properties such as filterability, turbidity, etc. In one embodiment, the clarified diutan may be modified by genetic engineering or bacteria selection or the result of chemical treatment or derivatization of a diutan. An example of such a modification would be where a portion of the diutan is oxidized or hydrolyzed. Suitable clarified diutan may also be present in a form that will only partially hydrate or will not hydrate at ambient temperature. This form of clarified diutan may be chemically modified, chemically coated, genetically modified, or produced from a new strain of bacteria.

In general, diutan is a polysaccharide, which may be prepared by fermentation of a strain of *sphingomonas*. Diutan may also be referred to as a polysaccharide designated S-657 and/or S-8 in some literature. Its structure has been elucidated as having a repeat unit of a hexasaccharide with a tetrasaccharide repeat unit in the backbone that comprises glucose and rhamnose units and a di-rhamnose side chain. It is believed to have thickening, suspending, and stabilizing properties in aqueous and/or nonaqueous solutions. Details of the diutan gum structure may be found in an article by Diltz et al., "Location of O-acetyl Groups in S-657 Using the Reductive-Cleavage Method," CARBOHYDRATE RESEARCH, Vol. 331, p. 265-270 (2001), which is hereby incorporated by reference in its entirety. Details of preparing diutan gum may be found in U.S. Pat. No. 5,175,278, which is hereby incorporated by reference in its entirety. A suitable source of diutan that may be chemically treated to obtain clarified diutan is "GEOVIS XT," which is commercially available from Kelco Oil Field Group, Houston, Tex. Another suitable source of clarified diutan is "FDP-S848-07" and "FDP-S849-07," both of which are available from Halliburton Energy Services, Duncan, Okla. Other examples of suitable sources of clarified diutan may include those disclosed in U.S. Patent Application Nos. 2006/0121578 and 2006/0199201, the relevant disclosures of which are herein incorporated by reference.

The gelling agent comprising clarified diutan may be provided in any form that is suitable for the particular treatment fluid and/or application of the present invention. In certain embodiments, the gelling agent may be provided as a liquid, gel, suspension, and/or solid additive that is admixed or incorporated into a treatment fluid used in conjunction with the present invention. The gelling agent may also be present in a solid particulate form of any size or shape. For example, larger sized particulates of spherical shape may be used, *inter alia*, to form perforation tunnel blocking particles, similar to perforation pack balls. Similarly, smaller sized particulates may be used, *inter alia*, as a fluid loss control material that may act to bridge natural fractures or other channels. The gelling agent should be present in a treatment fluid of the present invention in an amount sufficient to impart the desired viscosity (e.g., sufficient viscosity to divert flow, reduce fluid loss, suspend particulates, provide friction reduction, etc.) to a treatment fluid. More specifically, in some embodiments, the amount of gelling agent used in the treatment fluids of the present invention may vary from about 0.25 pounds per 1000 gallons of treatment fluid ("lbs/Mgal") to about 200 lbs/Mgal. In other embodiments, the amount of gelling agent included in the treatment fluids of the present invention may vary from about 30 lbs/Mgal to about 80 lbs/Mgal. In another embodiment, about 60 lbs/Mgal of a gelling agent is included in a treatment fluid of the present invention. It should be noted that in well bores comprising bottom hole temperatures of 200° F. or more, 70 lbs/Mgal or more of the gelling agent may be beneficially used in a treatment fluid of the present invention. In embodiments in which the amount of clarified diutan approaches 200 lbs/Mgal, the clarified diutan may act to increase the viscosity of the treatment fluid so that the treatment fluid may be used as a diverting fluid, fluid loss pill to seal a formation, or as a chemical pig.

In some embodiments, a treatment fluid of the present invention comprising a suitable clarified diutan at a 0.1% concentration in deionized water, in a 1 cm optical cell, has a transmittance at 600 nanometers ("nm") wavelength of at least about 65%. In some embodiments, the clarified diutan has a transmittance of at least about 75%. In some embodiments, the clarified diutan has a transmittance of at least about 85%. One of ordinary skill in the art with the benefit of this disclosure will recognize that the transmittance of any particular treatment fluid of the present invention may also vary depending on the addition of certain additives, the composition of the treatment fluid, the degree of hydration of the clarified diutan, the temperature, and the pH of the treatment fluid. For example, ordinary, unclarified diutan such as GEOVIS XT has a transmittance of about 58% or less.

In some embodiments, a treatment fluid of the present invention comprising a suitable clarified diutan at a 0.1% concentration in deionized water, in a 1 cm optical cell, has a transmittance at 350 nanometers ("nm") wavelength of at least about 20%. In some embodiments, the clarified diutan has a transmittance of at least about 25%. In some embodiments, the clarified diutan has a transmittance of at least about 30%. In some embodiments, the clarified diutan has a transmittance of at least about 40%. In some embodiments, the clarified diutan has a transmittance of at least about 50%. In some embodiments, the clarified diutan has a transmittance of at least about 60%. In some embodiments, the clarified diutan has a transmittance of at least about 70%. In some embodiments, the clarified diutan has a transmittance of at least about 80%. In some embodiments, the clarified diutan has a transmittance of at least about 90%. One of ordinary skill in the art with the benefit of this disclosure will recognize that the transmittance of any particular treatment fluid of the present invention may also vary depending on the addition of certain additives, the composition of the treatment fluid, the degree of hydration of the clarified diutan, the temperature, and the pH of the treatment fluid. For example, ordinary, unclarified diutan such as GEOVIS XT has a transmittance of about 18% or less.

In other embodiments, a treatment fluid of the present invention comprising a suitable clarified diutan in an amount of 42 lbs/Mgal in a sodium bromide brine having a density of 11.5 pounds per gallon (ppg) may have a fluid loss greater than about 30 grams in 5 minutes at ambient temperature in a filtering laboratory test on a Baroid Filter Press using 40 psi of differential pressure and a 11 cm Whatman #50 filter paper having a 2.7µ pore size. In some embodiments, a treatment fluid of the present invention may have a fluid loss greater than about 35 grams in 5 minutes. In some embodiments, a treatment fluid of the present invention may have a fluid loss greater than about 40 grams in 5 minutes. In some embodiments, a treatment fluid of the present invention may have a fluid loss greater than about 45 grams in 5 minutes. For example, ordinary, unclarified diutan such as GEOVIS XT has a fluid loss of about 25 g or less.

In other embodiments, a treatment fluid of the present invention comprising a suitable clarified diutan in an amount of 42 lbs/Mgal in a sodium bromide brine having a density of 11.5 pounds per gallon (ppg) may have a fluid loss greater than about 145 grams in 5 minutes at ambient temperature in a filtering laboratory test on a Baroid Filter Press using 40 psi of differential pressure and a 11 cm Whatman #2 filter paper having a 8µ pore size. In some embodiments, a treatment fluid of the present invention may have a fluid loss greater than about 150 grams in 5 minutes. In some embodiments, a treatment fluid of the present invention may have a fluid loss greater than about 155 grams in 5 minutes. In some embodiments, a treatment fluid of the present invention may have a fluid loss greater than about 160 grams in 5 minutes. For example, ordinary, unclarified diutan such as GEOVIS XT has a fluid loss of about 140 g or less.

In other embodiments, a treatment fluid of the present invention comprising a suitable clarified diutan in an amount of 42 lbs/Mgal in a sodium bromide brine having a density of 11.5 pounds per gallon (ppg) may have a fluid loss greater than about 115 grams in 2.5 minutes at ambient temperature in a filtering laboratory test on a Baroid Filter Press using 40 psi of differential pressure and a 11 cm Whatman #2 filter paper having a 8µ pore size. In some embodiments, a treatment fluid of the present invention may have a fluid loss greater than about 120 grams in 2.5 minutes. In some embodiments, a treatment fluid of the present invention may have a fluid loss greater than about 130 grams in 2.5 minutes. For example, ordinary, unclarified diutan such as GEOVIS XT has a fluid loss of about 110 g or less. In some embodiments, a treatment fluid of the present invention may have a fluid loss greater than about 140 grams in 2.5 minutes. One of ordinary skill in the art with the benefit of this disclosure will recognize that the filtration rate of any particular treatment fluid of the present invention may also vary depending on the addition of certain additives, the composition of the treatment fluid, the degree of hydration of the clarified diutan, the temperature, and the pH of the treatment fluid.

Suitable base fluids for use in the present invention include aqueous base fluids and nonaqueous base fluids. Suitable aqueous base fluids that may be used in the treatment fluids of the present invention may include fresh water, salt water, brine, seawater, or any other aqueous fluid that, preferably, does not adversely interact with the other components used in accordance with this invention or with the subterranean formation. The aqueous base fluid preferably is present in the treatment fluids of the present invention in an amount sufficient to substantially hydrate the gelling agent to form a viscosified treatment fluid. Suitable nonaqueous base fluids that may be used in the treatment fluids of the present invention may include glycerol, glycol, polyglycols, ethylene glycol, propylene glycol, and dipropylene gylcol methyl ether. Other examples of suitable nonaqueous base fluids that may be used in the present invention are disclosed in U.S. Pat. No. 6,632,779, the relevant disclosure of which is herein incorporated by reference. In some embodiments, the base fluid may be present in the treatment fluids of the present invention in an amount in the range from about 5% to 99.99% by volume of the treatment fluid.

In some embodiments, the base fluids suitable for use in the treatment fluids of the present invention may be foamed (e.g., a liquid that comprises a gas such as nitrogen or carbon dioxide). As used herein, the term "foamed" also refers to co-mingled fluids. In certain embodiments, it may desirable that the base fluid is foamed to, inter alia, reduce the amount of base fluid that is required, e.g. in water sensitive subterranean formations, to reduce fluid loss to the subterranean formation, enhance flow back of fluids, and/or to provide enhanced proppant suspension. In addition, in certain embodiments where the treatment fluids of the present invention are used for fluid diversion, it may be desirable that the treatment be foamed. While various gases can be utilized for foaming the treatment fluids of this invention, nitrogen, carbon dioxide, and mixtures thereof are preferred. In examples of such embodiments, the gas may be present in a treatment fluid of the present invention in an amount in the range of from about 5% to about 98% by volume of the treatment fluid, and more preferably in the range of from about 20% to about 80%. The amount of gas to incorporate into the fluid may be affected by factors including the viscosity of the fluid and wellhead pressures involved in a particular application. One example of a foamed fluid suitable for use with the present invention are those disclosed in U.S. Pat. No. 7,261,158, the relevant disclosure of which is herein incorporated by reference.

If desired, the treatment fluids of the present invention may also be used in the form of an emulsion. An example of a suitable emulsion would comprise an aqueous base fluid comprising a clarified diutan gelling agent and a suitable hydrocarbon. In some embodiments, the emulsion may comprise approximately 30% of an aqueous base fluid and 70% of a suitable hydrocarbon. In some embodiments, the external phase of the emulsion would be aqueous. In certain embodiments, it may be desirable to use an emulsion to, inter alia, reduce fluid loss to the subterranean formation, and/or to provide enhanced proppant suspension. Other benefits and advantages to using emulsions in the methods of the present invention will be evident to one of ordinary skill in the art.

The treatment fluids of the present invention may vary widely in density. One of ordinary skill in the art with the benefit of this disclosure will recognize the particular density that is most appropriate for a particular application. In some embodiments, the density of the non-foamed treatment fluids of the present invention generally may approximate the density of water. In other embodiments, the density of the non-foamed treatment fluids of the present invention generally may range from about 8.3 pounds per gallon ("ppg") to about 20.5 ppg. One of ordinary skill in the art with the benefit of this disclosure will recognize that the density of any particular treatment fluid of the present invention may also vary depending on the addition of certain additives, including, but not limited to, proppant, gas, fluid loss control additives, alcohols, glycols, and/or hydrocarbons. Furthermore, the desired density for a particular treatment fluid may depend on characteristics of the subterranean formation, including, inter alia, the hydrostatic pressure required to control the fluids of the subterranean formation during placement of the treatment fluids, and the hydrostatic pressure which will damage the subterranean formation. For example, if the treatment fluid remains in the well bore, the density of the treatment fluid may be adjusted to, inter alia, prevent the changing of position of a fluid relative to another fluid with a different density, thereby leaving the treatment fluid at the correct placement within the well bore.

In some embodiments, the treatment fluid may comprise a brine. Brines suitable for use in some embodiments of the present invention may include those that comprise monovalent, divalent, or trivalent cations. Some divalent or trivalent cations, such as magnesium, calcium, iron, and zirconium, may, in some concentrations and at some pH levels, cause undesirable crosslinking of a diutan polymer. If a water source is used which contains such divalent or trivalent cations in concentrations sufficiently high to be problematic, then such divalent or trivalent salts may be removed, either by a process such as reverse osmosis, or by raising the pH of the water in order to precipitate out such salts to lower the concentration of such salts in the water before the water is used. Another method would be to include a chelating agent to chemically bind the problematic ions to prevent their undesirable interactions with the diutan. As used herein, the term "chelating agent" or "chelant" also refers to sequestering agents and the like. Suitable chelants include, but are not limited to, citric acid or sodium citrate. Other chelating agents also are suitable. Brines, where used, may be of any weight. Examples of suitable brines include calcium bromide brines, zinc bromide brines, calcium chloride brines, sodium chloride brines, sodium bromide brines, potassium bromide brines, potassium chloride brines, sodium nitrate brines, sodium formate brines, potassium formate brines, cesium formate brines, magnesium chloride brines, mixtures thereof, and the like. The brine chosen should be compatible with the formation and should have a sufficient density to provide the appropriate degree of well control. Additional salts may be added to a water source, e.g., to provide a brine, and a resulting viscosified treatment fluid, having a desired density. A preferred suitable brine is seawater. The gelling agents of the present invention may be used successfully with seawater.

Optionally, the gelling agents of the present invention may comprise an additional gelling agent if the use of the clarified diutan and the gelling agent produces a desirable result, e.g., a synergistic effect. In some embodiments, clarified diutan may be used in combination with other gelling agents so that the clarified duitan only imparts its viscosity once the treatment fluid has entered the formation to provide viscosity at elevated temperatures where other gelling agents may no longer provide adequate viscosity. Suitable additional gelling agents may include polysaccharides and galactomannan gums. Depending on the application, one gelling agent may be more suitable than another. One of ordinary skill in the art with the benefit of this disclosure will be able to determine if an additional gelling agent should be included for a particular application based on, for example, the desired viscosity of the treatment fluid and the bottom hole temperature ("BHT") of the well bore.

In certain embodiments, the treatment fluids of the present invention also may optionally comprise salts, pH control additives, surfactants, breakers, bactericides, crosslinkers, fluid loss control additives, stabilizers, chelants, scale inhibitors, corrosion inhibitors, hydrate inhibitors, clay stabilizers, salt substitutes (such as tetramethyl ammonium chloride), relative permeability modifiers (such as HPT-1™ available from Halliburton Energy Services, Duncan, Oklahoma), sulfide scavengers, fibers, nanoparticles, combinations thereof, or the like.

Salts may optionally be included in the treatment fluids of the present invention for many purposes, including, for reasons related to compatibility of the treatment fluid with the formation and formation fluids. To determine whether a salt may be beneficially used for compatibility purposes, a compatibility test may be performed to identify potential compatibility problems. From such tests, one of ordinary skill in the art with the benefit of this disclosure will be able to determine whether a salt should be included in a treatment fluid of the present invention. Suitable salts include, but are not limited to, calcium chloride, sodium chloride, magnesium chloride, potassium chloride, sodium bromide, potassium bromide, ammonium chloride, sodium formate, potassium formate, cesium formate, mixtures thereof, and the like. The amount of salt that should be added should be the amount necessary for formation compatibility, such as stability of clay minerals, taking into consideration the crystallization temperature of the brine, e.g., the temperature at which the salt precipitates from the brine as the temperature drops.

Examples of suitable pH control additives which may optionally be included in the treatment fluids of the present invention are bases and/or acid compositions. A pH control additive may be necessary to maintain the pH of the treatment fluid at a desired level, e.g., to improve the effectiveness of certain breakers and to reduce corrosion on any metal present in the well bore or formation, etc. In some instances, it may be beneficial to maintain the pH at neutral or above 7. For example, in certain embodiments, increasing the pH to 7 or above will give additional stability to the fluid at higher temperatures. One of ordinary skill in the art with the benefit of this disclosure will be able to recognize a suitable pH for a particular application.

In one embodiment, the pH control additive may be an acid composition. Examples of suitable acid compositions may comprise an acid, an acid generating compound, and combinations thereof. Any known acid may be suitable for use with the treatment fluids of the present invention. Examples of acids that may be suitable for use in the present invention include, but are not limited to organic acids (e.g., formic acids, acetic acids, carbonic acids, citric acids, glycolic acids, lactic acids, ethylenediaminetetraacetic acid ("EDTA"), hydroxyethyl ethylenediamine triacetic acid ("HEDTA"), and the like), inorganic acids (e.g., hydrochloric acid, hydrofluoric acid, phosphonic acid, p-toluenesulfonic acid, and the like), and combinations thereof.

Examples of acid generating compounds that may be suitable for use in the present invention include, but are not limited to, esters, aliphatic polyesters, ortho esters, which may also be known as ortho ethers, poly (ortho esters), which may also be known as poly(ortho ethers), poly(lactides), poly (glycolides), poly($\epsilon$-caprolactones), poly(hydroxybutyrates), poly(anhydrides), or copolymers thereof. The term "copolymer" as used herein is not limited to the combination of two polymers, but includes any combination of polymers, e.g., terpolymers and the like. Derivatives and combinations also may be suitable. Other suitable acid-generating compounds include: esters including, but not limited to, ethylene glycol monoformate, ethylene glycol diformate, diethylene glycol diformate, glyceryl monoformate, glyceryl diformate, glyceryl triformate, triethylene glycol diformate and formate esters of pentaerythritol. Other suitable materials may be disclosed in U.S. Pat. Nos. 6,877,563 and 7,021,383, the disclosures of which are incorporated by reference.

The pH control additive also may comprise a base to elevate the pH of the treatment fluid. Generally, a base may be used to elevate the pH of the mixture to greater than or equal to about 7. Having the pH level at or above 7 may have a positive effect on a chosen breaker being used and may also inhibit the corrosion of any metals present in the well bore or formation, such as tubing, sand screens, etc. In addition, having a pH greater than 7 may also impart greater stability to the viscosity of the treatment fluid, thereby enhancing the length of time that viscosity can be maintained. This could be beneficial in certain uses, such as in longer-term well control and in diverting. Any known base that is compatible with the gelling agents of the present invention can be used in the treatment fluids of the present invention. Examples of suitable bases include, but are not limited to, sodium hydroxide, potassium carbonate, potassium hydroxide, sodium carbonate, and sodium bicarbonate. An example of a suitable base is a solution of 25% sodium hydroxide commercially available from Halliburton Energy Services, Inc., of Duncan, Okla., under the tradename "MO-67™" pH control agent. Another example of a suitable base solution is a solution of potassium carbonate commercially available from Halliburton Energy Services, Inc., of Duncan, Okla., under the tradename "BA-40L™" buffering agent. One of ordinary skill in the art with the benefit of this disclosure will recognize the suitable bases that may be used to achieve a desired pH elevation.

In some embodiments, the treatment fluid may optionally comprise a chelating agent. When added to the treatment fluids of the present invention, the chelating agent may chelate any dissolved iron (or other divalent or trivalent cation) that may be present in the aqueous fluid. Such chelating may prevent such ions from crosslinking the gelling agent molecules. Such crosslinking may be problematic because, *inter alia*, it may cause filtration problems, injection problems, and/or cause regain permeability problems. Any suitable chelating agent may be used with the present invention. Examples of suitable chelating agents include, but are not limited to, an anhydrous form of citric acid, commercially available under the tradename "Fe-2™" Iron Sequestering Agent from Halliburton Energy Services, Inc., of Duncan, Okla. Another example of a suitable chelating agent is a solution of citric acid dissolved in water, commercially available under the tradename "Fe-2A™" buffering agent from Halliburton Energy Services, Inc., of Duncan, Okla. Other chelating agents that may be suitable for use with the present invention include, *inter alia*, nitrilotriacetic acid ("NTA"), any form of ethylene diamine tetracetic acid ("EDTA"), hydroxyethylethylenediaminetriacetic acid ("HEDTA"), dicarboxymethyl glutamic acid tetrasodium salt ("GLDA"), diethylenetriaminepentaacetic acid ("DTPA"), propylenediaminetetraacetic acid ("PDTA"), ethylenediaminedi(o-hydroxyphenylacetic) acid ("EDDHA"), glucoheptonic acid, gluconic acid, sodium citrate, phosphonic acid, salts thereof, and the like. In some embodiments, the chelating agent may be a sodium or potassium salt. Generally, the chelating agent may be present in an amount sufficient to prevent crosslinking of the gelling agent molecules by any free iron (or any other divalent or trivalent cation) that may be present. In one embodiment, the chelating agent may be present in an amount of from about 0.02% to about 50.0% by weight of the treatment fluid. In another embodiment, the chelating agent is present in an amount in the range of from about 0.02% to about 2.0% by weight of the treatment fluid. One of ordinary skill in the art with the benefit of this disclosure will be able to determine the proper concentration of a chelating agent for a particular application.

In some embodiments, the treatment fluids of the present invention may include surfactants, e.g., to improve the compatibility of the treatment fluids of the present invention with other fluids (like any formation fluids) that may be present in the well bore. One of ordinary skill in the art with the benefit of this disclosure will be able to identify the type of surfactant as well as the appropriate concentration of surfactant to be used. Suitable surfactants may be used in a liquid or powder form. Where used, the surfactants may be present in the treatment fluid in an amount sufficient to prevent incompatibility with formation fluids, other treatment fluids, or well bore fluids. In an embodiment where liquid surfactants are used, the surfactants are generally present in an amount in the range of from about 0.01% to about 5.0% by volume of the treatment fluid. In one embodiment, the liquid surfactants are present in an amount in the range of from about 0.1% to about 2.0% by volume of the treatment fluid. In embodiments where powdered surfactants are used, the surfactants may be present in an amount in the range of from about 0.001% to about 0.5% by weight of the treatment fluid. Examples of suitable surfactants are non-emulsifiers commercially available from Halliburton Energy Services, Inc., of Duncan, Okla., under the tradenames "LOSURF-259™" nonionic nonemulsifier, "LOSURF-300™" nonionic surfactant, "LOSURF-357™" nonionic surfactant, and "LOSURF-400™" surfactant. Another example of a suitable surfactant is a non-emulsifier commercially available from Halliburton Energy Services, Inc., of Duncan, Okla., under the tradename "NEA-96M™" Surfactant.

In some embodiments, the surfactant may be a viscoelastic surfactant. These viscoelastic surfactants may be cationic, anionic, nonionic, amphoteric, or zwitterionic in nature. The viscoelastic surfactants may comprise any number of different compounds, including methyl ester sulfonates (e.g., as described in U.S. Patent Application Nos. 2006/0180310, 2006/0180309, 2006/0183646 and U.S. Pat. No. 7,159,659, the relevant disclosures of which are incorporated herein by reference), hydrolyzed keratin (e.g., as described in U.S. Pat. No. 6,547,871, the relevant disclosure of which is incorporated herein by reference), sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and combinations thereof.

It should be noted that, in some embodiments, it may be beneficial to add a surfactant to a treatment fluid of the present invention as that fluid is being pumped downhole to help eliminate the possibility of foaming. However, in those embodiments where it is desirable to foam the treatment fluids of the present invention, surfactants such as HY-CLEAN (HC-2)™ surface-active suspending agent or AQF-2™ additive, both commercially available from Halliburton Energy Services, Inc., of Duncan, Okla., may be used. Additional examples of foaming agents that may be utilized to foam and stabilize the acidic treatment fluids of this invention include, but are not limited to, betaines, amine oxides, methyl ester sulfonates, alkylamidobetaines such as cocoamidopropyl betaine, alpha-olefin sulfonate, trimethyltallowammonium chloride, C8 to C22 alkylethoxylate sulfate and trimethylcocoammonium chloride. Other suitable surfactants that may or may not be foamers in a particular application that are available from Halliburton Energy Services include: "19N," "G-Sperse Dispersant," "Howco-Suds™", foaming agent, and "A-Sperse™" dispersing aid for acid additives. Other suitable foaming agents and foam stabilizing agents may be included as well, which will be known to those skilled in the art with the benefit of this disclosure.

In other embodiments, it may be desirable to emulsify the treatment fluid with a hydrocarbon, forming a aqueous phase external emulsion. In these embodiments, an emulsifying surfactant would be used. One example of a suitable emulsifying surfactant includes a nonionic surfactant such as a sorbitan ester. SEM-7™ Emulsifier, available from Halliburton Energy Services in Duncan, Okla. is an example of another suitable surfactant. If a surfactant is used, generally an amount from about 0.1% to about 3% based on volume is sufficient. In some embodiments, the emulsion can be mixed and then pumped. In other embodiments, the components can be pumped and then mixed down hole.

Furthermore, in some embodiments, microemulsion additives may optionally be included in the treatment fluids of the present invention. Examples of suitable microemulsion additives include, but are not limited to, "Pen-88M™" surfactant, "Pen-88HT™", surfactant, "SSO-21E" surfactant, "SSO-21MW™" surfactant, GasPerm 1000™ Microemulsion Surfactant/Solvent Additive, which are all commercially available from Halliburton Energy Services, Inc., of Duncan, Okla. Other suitable microemulsion additives are MA-845 additive and MA-844 additive, commercially available from CESI Chemical of Duncan, Okla.; ShaleSurf 1000 additive, commercially available from Frac Tech Services of Aledo, Tex.; and those disclosed in U.S. Patent App. No. 2003/0166472, the relevant disclosure of which is incorporated by reference.

In some embodiments, the treatment fluids of the present invention may contain bactericides, *inter alia*, to protect both the subterranean formation as well as the treatment fluid from attack by bacteria. Such attacks may be problematic because they may lower the viscosity of the treatment fluid, resulting in poorer performance, such as poorer sand suspension properties, for example. Any bactericides known in the art are suitable. An artisan of ordinary skill with the benefit of this disclosure will be able to identify a suitable bactericide and the proper concentration of such bactericide for a given application. Where used, such bactericides are present in an amount sufficient to destroy all bacteria that may be present. Examples of suitable bactericides include, but are not limited to, a 2,2-dibromo-3-nitrilopropionamide, commercially available under the tradename "BE-3S™" biocide from Halliburton Energy Services, Inc., of Duncan, Okla., and a 2-bromo-2-nitro-1,3-propanediol commercially available under the tradename "BE-6™" biocide from Halliburton Energy Services, Inc., of Duncan, Okla. In one embodiment, the bactericides are present in the treatment fluid in an amount in the range of from about 0.001% to about 1.0% by weight of the treatment fluid. In certain embodiments, when bactericides are used in the treatment fluids of the present invention, they may be added to the treatment fluid before the gelling agent is added.

The treatment fluids of the present invention optionally may comprise a suitable crosslinker to crosslink the clarified diutan gelling agent in the treatment fluid. Crosslinking may be desirable at higher temperatures and/or when the sand suspension properties of a particular fluid of the present invention may need to be altered for a particular purpose. In addition, crosslinking may be beneficial when using the treatment fluids of the present invention to seal formation zones from loss of fluid from the well bore or when used as a pig for pipeline cleaning. Suitable crosslinkers include, but are not limited to, boron derivatives and salts thereof; potassium derivatives, including but not limited to, potassium periodate; ferric iron complexes and compounds; magnesium complexes and compounds; calcium complexes and compounds, barium complexes and compounds, copper complexes and compounds, aluminum complexes and compounds, cadmium complexes and compounds, zinc complexes and compounds, mercury complexes and compounds, nickel complexes and compounds, lead complexes and compounds, chrome (chromium) complexes and compounds, zirconium complexes and compounds; antimony complexes and compounds; and titanium complexes and compounds. Another example of suitable crosslinkers are those disclosed in U.S. Patent Application Publication No. 2008/0035338, the relevant disclosure of which is herein incorporated by reference. Any crosslinker that is compatible with the gelling agent may be used. One of ordinary skill in the art with the benefit of this disclosure will recognize when such crosslinkers are appropriate and what particular crosslinker will be most suitable.

The treatment fluids of the present invention also may comprise breakers capable of reducing the viscosity of the treatment fluid at a desired time. Examples of such suitable breakers for treatment fluids of the present invention include, but are not limited to, sodium chlorites, hypochlorites, perborate, persulfates, peroxides, including organic peroxides. Other suitable breakers include, but are not limited to, suitable acids and peroxide breakers, delinkers, as well as enzymes that may be effective in breaking diutan. Another example of suitable breakers are those in U.S. Patent Application Publication No. 2008/0035338, the relevant disclosure of which is herein incorporated by reference. Preferred examples of peroxide breakers include tert-butyl hydroperoxide and tert-amyl hydroperoxide. A breaker may be included in a treatment fluid of the present invention in an amount and form sufficient to achieve the desired viscosity reduction at a desired time. The breaker may be formulated to provide a delayed break, if desired. For example, a suitable breaker may be encapsulated if desired. Suitable encapsulation methods are known to those skilled in the art. One suitable encapsulation method that may be used involves coating the chosen breakers with a material that will degrade when downhole so as to release the breaker when desired. Resins that may be suitable include, but are not limited to, polymeric materials that will degrade when downhole. The terms "degrade," "degradation," or "degradable" refer to both the two relatively extreme cases of degradation that the degradable material may undergo, i.e., heterogeneous (or bulk erosion) and homogeneous (or surface erosion), and any stage of degradation in between these two. This degradation can be a result of, inter alia, a chemical or thermal reaction or a reaction induced by radiation. Suitable examples of degradable materials include, but are not limited to, polysaccharides such as dextran or cellulose; chitins; chitosans; proteins; aliphatic polyesters; poly(lactides); poly(glycolides); poly($\epsilon$-caprolactones); poly(hydroxybutyrates); poly(anhydrides); aliphatic polycarbonates; orthoesters, poly(orthoesters); poly(amino acids); poly(ethylene oxides); and polyphosphazenes. If used, a breaker should be included in a treatment fluid of the present invention in an amount sufficient to facilitate the desired reduction in viscosity in a treatment fluid. For instance, peroxide concentrations that may be used vary from about 0.1 to about 30 gallons of peroxide per 1000 gallons of the treatment fluid.

Optionally, a treatment fluid of the present invention may comprise an activator or a retarder, inter alia , to optimize the break rate provided by the breaker. Any known activator or retarder that is compatible with the particular breaker used is suitable for use in the present invention. Examples of such suitable activators include, but are not limited to, acid generating materials, chelated iron, copper, cobalt, and reducing sugars. Examples of suitable retarders include sodium thiosulfate, methanol, and diethylene triamine. In some embodiments, the sodium thiosulfate may be used in a range of from about 1 to about 100 lbs/Mgal of treatment fluid. A preferred range may be from about 5 to about 20 lbs/Mgal. An artisan of ordinary skill with the benefit of this disclosure will be able to identify a suitable activator or retarder and the proper concentration of such activator or retarder for a given application.

The treatment fluids of the present invention also may comprise suitable fluid loss control agents. Such fluid loss control agents may be particularly useful when a treatment fluid of the present invention is being used in a fracturing application or in a fluid used to seal a formation from invasion of fluid from the well bore. Any fluid loss agent that is compatible with the treatment fluids of the present invention is suitable for use in the present invention. Examples include, but are not limited to, starches, silica flour, gas bubbles (energized fluid or foam), benzoic acid, soaps, resin particulates, relative permeability modifiers, degradable gel particulates, diesel dispersed in fluid, and other immiscible fluids. Another example of a suitable fluid loss control additive is one that comprises a degradable material. Suitable examples of degradable materials include polysaccharides such as dextran or cellulose; chitins; chitosans; proteins; aliphatic polyesters; poly(lactides); poly(glycolides); poly (glycolide-co-lactides); poly($\epsilon$-caprolactones); poly(3-hydroxybutyrates); poly(3-hydroxybutyrate -co-hydroxyvalerates); poly(anhydrides); aliphatic poly(carbonates); poly(orthoesters); poly (amino acids); poly(ethylene oxides); poly(phosphazenes); derivatives thereof; or combinations thereof. If included, a fluid loss additive should be added to a treatment fluid of the present invention in an amount necessary to give the desired fluid loss control. In some embodiments, a fluid loss additive may be included in an amount of about 5 to about 2000 lbs/Mgal of the treatment fluid. In some embodiments, the fluid loss additive may be included in an amount from about 10 to about 50 lbs/Mgal of the treatment fluid. For some liquid additives like diesel, these may be included in an amount from about 0.01% to about 20% by volume; in some embodiments, these may be included in an amount from about 1.0% to about 10% by volume.

In certain embodiments, a stabilizer may optionally be included in the treatment fluids of the present invention. It may be particularly advantageous to include a stabilizer if a chosen treatment fluid is experiencing a viscosity degradation. One example of a situation where a stabilizer might be beneficial is where the BHT of the well bore is sufficient by itself to break the treatment fluid without the use of a breaker. Suitable stabilizers include, but are not limited to, sodium thiosulfate, methanol, and salts such as formate salts and potassium chloride. Another example of a suitable stabilizer includes surfactants, such as those in U.S. Patent Application Publication No. 2007/0256836, the relevant disclosure of which is herein incorporated by reference. Such stabilizers may be useful when the treatment fluids of the present invention are utilized in a subterranean formation having a temperature above about 200° F. If included, a stabilizer may be added in an amount of from about 1 to about 50 lbs/Mgal of treatment fluid. In other embodiments, a stabilizer may be included in an amount of from about 5 to about 20 lbs/Mgal of treatment fluid. In certain embodiments where the stabilizer chosen is a salt, the stabilizer may be included in an amount of from about 5 lbs/Mgal to about saturation of the treatment fluid. In certain embodiments where the stabilizer chosen is a surfactant, the stabilizer may be included in an amount of from about 0.001% to about 5.0% of the treatment fluid.

Scale inhibitors may be added to the treatment fluids of the present invention, for example, when a treatment fluid of the present invention is not particularly compatible with the formation waters in the formation in which it is being used. This may include water soluble organic molecules with carboxylic acid, aspartic acid, maleic acids, sulphonic acids, phosphonic acid and phosphate esters groups including copolymers, terpolymers, grafted copolymers, and derivatives thereof. Examples of such compounds include aliphatic phosphonic acids such as diethylene triamine penta (methylene phosphonate) and polymeric species such as polyvinylsulphonate. The scale inhibitor may be in the form of the free acid but is preferably in the form of mono and polyvalent cation salts such as Na, K, Al, Fe, Ca, Mg, $NH_4$. Any scale inhibitor that is compatible with the treatment fluid in which it will be used in suitable for use in the present invention. An example of a suitable scale inhibitor is Scalechek LP-55™ scale inhibitor commercially available from Halliburton Energy Services in Duncan, Okla. Another example of a suitable scale inhibitor is LP-65™ scale inhibitor commercially available from Halliburton Energy Services in Duncan, Okla. If used, a scale inhibitor should be included in an amount effective to inhibit scale formation. Suitable amounts of scale inhibitors that may be included in the treatment fluids of the present invention may range from about 0.05 to 100 gallons per about 1000 gallons of the treatment fluid.

Any particulates such as proppant and/or gravel that are commonly used in subterranean operations may be used in the present invention (e.g., sand, gravel, bauxite, ceramic materials, glass materials, polymer materials, wood, plant and vegetable matter, nut hulls, walnut hulls, cotton seed hulls, cement, fly ash, fibrous materials, composite particulates, hollow spheres and/or porous proppant). It should be understood that the term "particulate," as used in this disclosure, includes all known shapes of materials including substantially spherical materials, oblong, ellipsoid, rod-like, polygonal materials (such as cubic materials), mixtures thereof, and the like. In some embodiments, resin and/or tackifying agent coated particulates may be suitable for use in the treatment fluids of the present invention. In addition, proppants that have been chemically treated or coated may also be used. The term "coated" does not imply any particular degree of coverage of the proppant particulates with the resin and/or tackifying agent. Examples of tackifying agents suitable for coating particulates are described in U.S. Pat. Nos. 5,853,048; 5,833,000; 5,582,249; 5,775,425; 5,787,986, 7,131,491 the relevant disclosures of which are herein incorporated by reference. An example of a suitable commercially available tackifying agent is the "SAND WEDGE" product sold by Halliburton Energy Services, Inc. of Duncan, Okla. Examples of resins suitable for coating particulates are described in U.S. Pat. Nos. 6,668,926; 6,729,404; and 6,962,200. An example of a suitable commercially available resin is the "EXPEDITE" product sold by Halliburton Energy Services, Inc. of Duncan, Okla.

The treatment fluids of the present may be provided and introduced into the subterranean formation in certain embodiments of the present invention by any means known in the art. The treatment fluid may be prepared at the job site, prepared at a plant or facility prior to use, or certain components of the treatment fluid (e.g., the base fluid and the gelling agent) may be pre-mixed prior to use and then transported to the job site. Certain components of the treatment fluid may be provided as a "dry mix" to be combined with the base fluid and/or other components prior to or during introducing the treatment fluid into the subterranean formation.

In certain embodiments, the preparation of these treatment fluids of the present invention may be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing. In some embodiments of the present invention, the gelling agent comprising clarified diutan may be mixed into the base fluid on the fly.

In certain embodiments, the treatment fluid may be introduced into the subterranean formation by pumping the treatment fluid into a well bore that penetrates a portion of the subterranean formation. In certain embodiments (e.g., fracturing operations), the treatment fluid may be introduced into the subterranean formation at or above a pressure sufficient to create or enhance one or more fractures in a portion of the subterranean formation.

In some embodiments, the treatment fluids of the present invention may be placed in a subterranean formation utilizing a hydrajet tool. The hydrajet tool may be capable of increasing or modifying the velocity and/or direction of the flow of a fluid into a subterranean formation from the velocity and/or direction of the flow of that fluid down a well bore. One of the potential advantages of using a hydrajet tool is that a fluid may be introduced adjacent to and localized to specific areas of interest along the well bore without the use of mechanical or chemical barriers. Some examples of suitable hydrajet tools are described in U.S. Pat. Nos. 5,765,642, 5,494,103, and 5,361,856, the relevant portions of which are hereby incorporated by reference.

In some embodiments in which a hydrajet tool is used, the fluid(s) introduced through the hydrajet tool are introduced at a pressure sufficient to result in the creation of at least one new fracture in the formation. In one example of a hydrajetting operation carried out at an elevated pressure, a hydrajetting tool having at least one fluid jet forming nozzle is positioned adjacent to a formation to be fractured, and fluid is then jetted through the nozzle against the formation at a pressure sufficient to form a cavity, or slot therein to fracture the formation by stagnation pressure in the cavity. Because the jetted fluids would have to flow out of the slot in a direction generally opposite to the direction of the incoming jetted fluid, they are trapped in the slot and create a relatively high stagnation pressure at the tip of a cavity. This high stagnation pressure may cause a micro-fracture to be formed that extends a short distance into the formation. That micro-fracture may be further extended by pumping a fluid into the well bore to raise the ambient fluid pressure exerted on the formation while the formation is being hydrajetted. Such a fluid in the well bore will flow into the slot and fracture produced by the fluid jet and, if introduced into the well bore at a sufficient rate and pressure, may be used to extend the fracture an additional distance from the well bore into the formation.

The methods and treatment fluids of the present invention may be used during or in preparation for any subterranean operation wherein a fluid may be used. Suitable subterranean operations may include, but are not limited to, drilling operations, hydraulic fracturing treatments, fracturing treatments such as those disclosed in U.S. Pat. No. 7,261,158, the relevant disclosure of which is hereby incorporated by reference, sand control treatments (e.g., gravel packing), acidizing treatments (e.g., matrix acidizing, fracture acidizing, removal of filter cakes and fluid loss pills), "frac-pack" treatments, well bore clean-out treatments, and other suitable operations where a treatment fluid of the present invention may be useful. The treatment fluids of the present invention may also be used in conjunction with a remedial treatment utilizing vibrational waves, an example of which is disclosed in U.S. Patent Application No. 2006/0131012, the relevant disclosure of which is herein incorporated by reference. In addition, the treatment fluids of the present invention may also be used to reduce friction, as a spacer fluid, insulation fluid, as a diverter, as a fluid loss pill, as part of a drilling fluid, as a chemical pig in a well bore, or as a chemical pig in a pipeline. In some embodiments, the treatment fluid may also comprise a cement slurry.

In one embodiment, the present invention provides a method that comprises: providing a treatment fluid that comprises a base fluid and a gelling agent that comprises a clarified diutan; and introducing the treatment fluid into a subterranean formation. In some embodiments, placing the treatment fluid into the subterranean formation comprises placing the treatment fluid into a well bore penetrating the subterranean formation.

In certain embodiments, the treatment fluid may be introduced into the subterranean formation at or above a pressure sufficient to create or enhance at least one fracture in the subterranean formation. In certain embodiments, the treatment fluid may comprise a plurality of gravel particulates, and the methods may further comprise depositing at least a portion of those particulates in a desired area in a well bore, e.g., to form a gravel pack, provide some degree of sand control in the subterranean formation, and/or prevent the flow of particulates from an unconsolidated portion of the subterranean formation (e.g., a propped fracture) into a well bore.

In certain embodiments, the present invention provides a method that comprises: providing a treatment fluid that comprises a base fluid, an acid composition and a gelling agent that comprises a clarified diutan; and introducing the treatment fluid into a subterranean formation. In some embodiments, these treatment fluids may be introduced into the subterranean formation at or above a pressure sufficient to create or enhance at least one fracture in the subterranean formation.

To facilitate a better understanding of the present invention, the following examples of certain aspects of some embodiments are given. In no way should the following examples be read to limit, or define, the entire scope of the invention.

EXAMPLES

Example 1

Rheological testing was conducted on treatment fluids of the present invention using a Grace M5600 viscometer. Sample 1 was prepared by blending 2 grams of "FDP-S848-07" in 200 milliliters ("mL") of 15% hydrochloric acid in a Waring Blender for approximately 10 minutes, with a 10 minute pressure test in the Grace M5600 prior to conducting the measurements. Sample 2 was prepared by blending 2 grams of "FDP-S848-07" in 200 milliliters ("mL") of 15% hydrochloric acid in a Waring Blender for approximately 30 minutes, with a 10 minute pressure test in the Grace M5600 prior to conducting the measurements. The comparative sample, Sample 3 was prepared by blending 2 grams of "GEOVIS XT," a non-clarified diutan, in 200 milliliters ("mL") of 15% hydrochloric acid in a Waring Blender for approximately 10 minutes, with a 10 minute pressure test in the Grace M5600 prior to conducting the measurements. Once prepared, the samples were placed in the cup of a Grace M5600 viscometer to determine the viscosity of the sample at several temperatures. The samples were subjected to a shear rate of about 100 $\sec^{-1}$ using a B1 bob with a shear sweep of 40, 100, and 170 $\sec^{-1}$. The sample temperatures were increased from room temperature to approximately 300° F. while the viscosities of the samples were measured. The results of this test are displayed in Tables 1, 2, and 3 for Samples 1, 2, and 3, respectively.

In this example, viscosities at several shear rates are measured at varying temperatures to calculate K' and n' as it depends on temperature. The power-law model relating viscosity, $\eta$, to shear rate, $\gamma\&$, is a two-parameter model given by $\eta = K'\gamma\&^{n'-1}$, where K' is commonly referred to as the consistency index and n' is the power-law exponent. For n'=0 the fluid has Newtonian viscosity, for n'>1 the fluid is shear-thickening, and for 0<n'<1 the fluid is shear-thinning. For some shear-thinning fluids, lower values of n' may indicate higher elastic properties.

FIG. 1 is a plot of the calculated viscosity (cP) of Sample 1 "FDP-S848-07" and Sample 3 ("GEOVIS XT") at 100 $\sec^{-1}$ vs. temperature (° F.).

TABLE 1

Sample 1

| Time (Min) | Temp (° F.) | n' | K' | Calculated Viscosity at 40 $\sec^{-1}$ | Calculated Viscosity at 100 $\sec^{-1}$ | Calculated Viscosity at 170 $\sec^{-1}$ |
|---|---|---|---|---|---|---|
| 4 | 79 | 0.6226 | 0.011 | 153 | 108 | 89 |
| 6 | 83 | 0.5429 | 0.016 | 158 | 104 | 82 |
| 7 | 90 | 0.5336 | 0.014 | 142 | 93 | 72 |
| 35 | 120 | 0.194 | 0.086 | 248 | 119 | 77 |
| 37 | 120 | 0.2696 | 0.06 | 229 | 117 | 80 |
| 38 | 124 | 0.2159 | 0.075 | 236 | 115 | 76 |
| 40 | 129 | 0.1961 | 0.087 | 255 | 122 | 80 |
| 144 | 145 | 0.3537 | 0.038 | 197 | 109 | 77 |
| 146 | 147 | 0.3488 | 0.038 | 194 | 107 | 75 |
| 147 | 153 | 0.3316 | 0.039 | 189 | 103 | 72 |
| 149 | 160 | 0.3188 | 0.037 | 173 | 92 | 64 |
| 158 | 171 | 0.174 | 0.04 | 106 | 50 | 32 |
| 160 | 173 | 0.1482 | 0.041 | 99 | 45 | 29 |
| 162 | 180 | 0.1329 | 0.04 | 91 | 41 | 26 |
| 163 | 186 | 0.1038 | 0.042 | 85 | 37 | 23 |
| 169 | 198 | 0.0397 | 0.052 | 78 | 32 | 19 |
| 172 | 210 | 0.0284 | 0.055 | 79 | 32 | 19 |
| 174 | 216 | 0.0034 | 0.066 | 81 | 32 | 19 |

TABLE 2

Sample 2

| Time (Min) | Temp (° F.) | n' | K' | Calculated Viscosity at 40 sec$^{-1}$ | Calculated Viscosity at 100 sec$^{-1}$ | Calculated Viscosity at 170 sec$^{-1}$ |
|---|---|---|---|---|---|---|
| 4 | 78 | 0.6502 | 0.011 | 159 | 116 | 96 |
| 6 | 83 | 0.5677 | 0.015 | 162 | 109 | 87 |
| 7 | 89 | 0.4582 | 0.023 | 171 | 104 | 78 |
| 25 | 116 | 0.2718 | 0.045 | 176 | 90 | 61 |
| 26 | 118 | 0.2794 | 0.047 | 187 | 97 | 66 |
| 28 | 122 | 0.2656 | 0.054 | 203 | 104 | 70 |
| 30 | 128 | 0.2713 | 0.052 | 202 | 104 | 71 |
| 44 | 142 | 0.2868 | 0.043 | 175 | 91 | 62 |
| 46 | 144 | 0.2455 | 0.053 | 186 | 93 | 62 |
| 47 | 151 | 0.2403 | 0.054 | 186 | 93 | 62 |
| 49 | 157 | 0.2539 | 0.049 | 179 | 90 | 61 |
| 54 | 168 | 0.2926 | 0.038 | 159 | 83 | 57 |
| 56 | 171 | 0.3445 | 0.029 | 145 | 80 | 56 |
| 58 | 178 | 0.3929 | 0.021 | 129 | 74 | 54 |
| 59 | 184 | 0.397 | 0.014 | 88 | 50 | 37 |
| 64 | 194 | 0.1003 | 0.023 | 47 | 21 | 13 |
| 66 | 199 | 0.0523 | 0.026 | 42 | 17 | 11 |
| 67 | 209 | 0.0057 | 0.033 | 41 | 16 | 10 |
| 69 | 215 | 0.0726 | 0.023 | 41 | 18 | 11 |
| 71 | 221 | 0.0093 | 0.032 | 41 | 17 | 10 |
| 73 | 226 | 0.0383 | 0.028 | 41 | 17 | 10 |
| 74 | 234 | 0.0271 | 0.029 | 41 | 17 | 10 |
| 76 | 241 | 0.021 | 0.029 | 40 | 16 | 10 |
| 78 | 245 | 0.0271 | 0.029 | 41 | 17 | 10 |
| 80 | 250 | 0.003 | 0.034 | 41 | 17 | 10 |
| 82 | 259 | 0.0023 | 0.034 | 42 | 17 | 10 |
| 83 | 267 | 0.0244 | 0.031 | 43 | 18 | 11 |
| 85 | 270 | 0.0285 | 0.031 | 44 | 18 | 11 |
| 87 | 275 | 0.0061 | 0.035 | 44 | 18 | 11 |
| 89 | 284 | 0.0086 | 0.033 | 42 | 17 | 10 |
| 90 | 290 | 0.008 | 0.036 | 46 | 19 | 11 |

TABLE 3

Sample 3

| Time (Min) | Temp (° F.) | n' | K' | Calculated Viscosity at 40 sec$^{-1}$ | Calculated Viscosity at 100 sec$^{-1}$ | Calculated Viscosity at 170 sec$^{-1}$ |
|---|---|---|---|---|---|---|
| 4 | 77 | 0.578 | 0.011 | 126 | 86 | 68 |
| 6 | 82 | 0.550 | 0.011 | 119 | 79 | 62 |
| 7 | 89 | 0.513 | 0.012 | 112 | 71 | 55 |
| 24 | 116 | 0.391 | 0.014 | 84 | 48 | 35 |
| 26 | 118 | 0.375 | 0.015 | 84 | 48 | 34 |
| 28 | 122 | 0.369 | 0.015 | 82 | 46 | 33 |
| 29 | 128 | 0.361 | 0.015 | 80 | 44 | 32 |
| 43 | 142 | 0.338 | 0.015 | 72 | 40 | 28 |
| 45 | 144 | 0.315 | 0.016 | 73 | 39 | 27 |
| 46 | 151 | 0.331 | 0.014 | 69 | 37 | 26 |
| 48 | 157 | 0.333 | 0.014 | 67 | 36 | 25 |
| 53 | 168 | 0.366 | 0.013 | 70 | 39 | 28 |
| 55 | 171 | 0.410 | 0.012 | 73 | 43 | 31 |
| 57 | 176 | 0.421 | 0.010 | 63 | 37 | 27 |
| 58 | 183 | 0.348 | 0.010 | 53 | 29 | 21 |
| 63 | 195 | 0.180 | 0.015 | 41 | 19 | 12 |
| 65 | 199 | 0.123 | 0.016 | 35 | 16 | 10 |
| 66 | 208 | 0.092 | 0.018 | 34 | 15 | 9 |
| 68 | 215 | 0.042 | 0.022 | 34 | 14 | 9 |
| 70 | 221 | 0.060 | 0.020 | 34 | 14 | 9 |
| 72 | 226 | 0.066 | 0.020 | 35 | 15 | 9 |
| 73 | 235 | 0.027 | 0.024 | 35 | 14 | 8 |
| 75 | 243 | 0.022 | 0.025 | 35 | 14 | 8 |
| 77 | 247 | 0.073 | 0.020 | 35 | 15 | 9 |
| 79 | 252 | 0.034 | 0.024 | 35 | 15 | 9 |
| 81 | 262 | 0.014 | 0.028 | 37 | 15 | 9 |
| 82 | 268 | 0.012 | 0.028 | 36 | 15 | 9 |
| 84 | 273 | 0.029 | 0.025 | 36 | 15 | 9 |
| 86 | 278 | 0.029 | 0.025 | 36 | 15 | 9 |
| 88 | 288 | 0.031 | 0.026 | 37 | 15 | 9 |

Example 2

Figure 2:
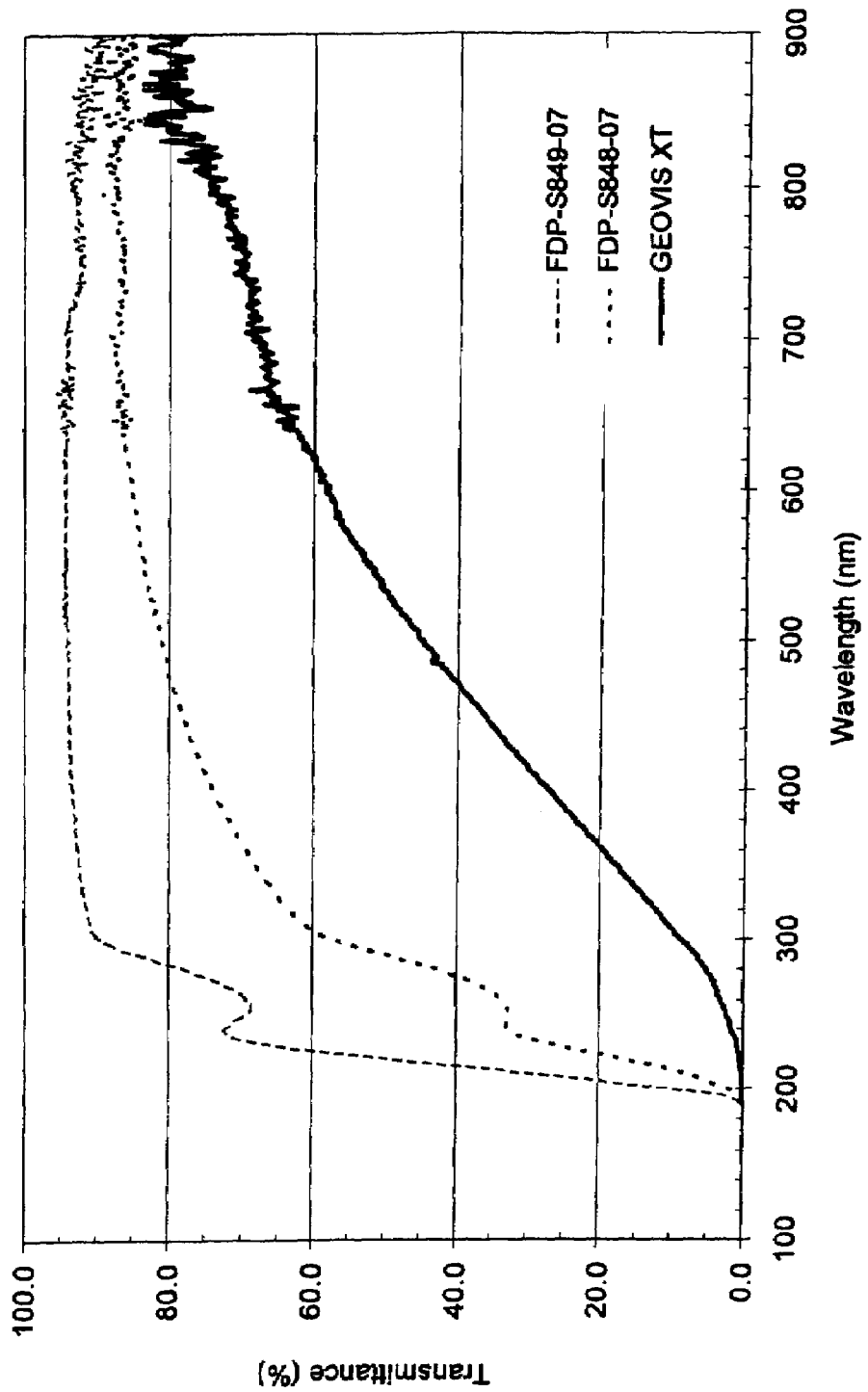
FIG. 2 illustrates the transmittance properties of clarified diutan and nonclarified diutan

To illustrate, *inter alia*, the transmittance characteristics of a suitable diutan of the present invention, the following procedure was performed. Three sample solutions were prepared by dissolving 0.2 grams of pure diutan powder in 200 mL of deionized water. Sample 4 contained 0.2 grams of "FDP-S849-07," a clarified diutan available from Halliburton Energy Services, Inc., in 200 mL of deionized water. Sample 5 contained 0.2 grams of "FDP-S848-07," a clarified diutan available from Halliburton Energy Services, Inc., in 200 mL of deionized water. Sample 6 contained 0.2 grams of "GEO-VIS XT," a nonclarified diutan available from Kelco Oil Field Group, in 200 mL of deionized water. For each sample solution, the deionized water was placed in a Waring blender and the diutan powder was slowly incorporated into the water over approximately ten seconds at 800 to 1,000 revolutions per minute ("rpm"). Each sample was then mixed in the blender for approximately one hour at 1,500 rpm. After approximately one hour, each sample was then centrifuged at room temperature at 1,000 rpm on a bench top centrifuge for approximately fifteen minutes to remove gas bubbles before measuring the transmittance. The transmittance measurement of each sample was then obtained by placing the sample in a UV-Visible spectrophotometer (e.g. Agilent 8453, Agilent Technologies Co.) in a 1 cm-thick quartz cell (Open-Top UV quartz cell 10 mm, 3.0 ml Vol.) between 190-900 nm wavelength at room temperature. The background spectrum was measured through air, not an empty cell, allowing this spectrum to be automatically subtracted from the sample spectrum. FIG. 2 illustrates the transmittance properties of clarified diutan and nonclarified diutan.

Example 3

To illustrate, *inter alia*, the friction reduction characteristics of a treatment fluid of the present invention comprising a suitable clarified diutan, the following procedure was performed. In this test, a 1-liter solution containing 50 pounds of "FDP-S848-07," available from Halliburton Energy Services, Inc., per 1000 gallons of Duncan tap water was added to 9 liters of Duncan tap water. Friction reduction measurements were collected on the ensuing 10-liter solution with a net concentration of 5 pounds of FDP-S848-07 per 1000 gallons of Duncan tap water.

This friction reduction test was performed using a Friction Reduction Meter ("FR Meter") in accordance with the procedure listed below. The FR Meter was a closed loop pipeline apparatus designed to measure the pressure drop across an 8-foot segment of a 13-foot smooth Hastelloy C pipe. The 8-foot test segment of the 13-foot pipe is positioned to significantly minimize pipe entrance and exit effects on the friction pressure measurement. The smooth Hastelloy C pipe had an inner diameter of 0.554 inches. The FR Meter included a storage/mixing tank connected to a fixed speed progressive cavity pump which pumped the test fluid through a magnetic flow meter then through the test pipes and a return line to the storage/mixing tank.

For this test, 9 liters of Duncan tap water were added to the storage/mixing tank. Next, the pump was run to circulate the tap water for an amount of time sufficient to fill all the pipes with water. Once the pipes were filled with water, the pump was stopped. The data acquisition system was started, and the pump was started after about an additional 10 to 15 seconds. The data acquisition system measured the flow rate, tank temperature, and pressure drop across the 8-foot section of pipe. At about 1 minute into the test, the 1-liter solution containing 50 pounds of FDP-S848-07 per 1000 gallons of Duncan tap water was added. The test was run for a total of about 20 minutes, with flow rate, tank temperature, and pressure drop across the 8-foot section of pipe recorded at one-second intervals. The pump rate was about 30 liters per minute, or 3 system volumes per minute. For the smooth Hastelloy C pipe, the flow was fully turbulent at a Reynolds Number between 50,000 and 60,000.

The first minute of data that was collected prior to the addition of the concentrated clarified diutan solution. This was used to verify instrument readings and provide a baseline of data with a known fluid with known friction pressure properties. The pressure drop across the 8-foot section of pipe for the freshwater was calculated from the flow rate and pipe dimensions in accordance with the following formula:

$$\Delta P_{water} = \frac{\rho V^2 L f}{2g_c D_h}$$

wherein $\Delta P_{water}$ is the calculated pressure drop for the water, $\rho$ is density of water, V is the velocity, L is length, $g_c$ is the gravitational constant, and $D_h$ is the pipe diameter. The variable f was calculated in accordance with the formula below for turbulent flow.

$$f = \left\{-2\log\left[\frac{\varepsilon/d}{3.7} - \frac{5.02}{N_{Re}}\log\left(\frac{\varepsilon/d}{3.7} + \frac{14.5}{N_{Re}}\right)\right]\right\}^{-2}$$

wherein $\varepsilon$ is pipe roughness, d is the pipe diameter, and $N_{Re}$ is the Reynolds Number (Shacham, M., *Isr. Chem. Eng.*, 8, 7E (1976)). For smooth pipe, $\varepsilon$ is zero.

Following the addition of the concentrated, clarified diutan to the tank, the measured pressure drop, was compared to the calculated pressure drop for the water to determine the % Friction Reduction ("% FR") using the following equation:

$$\% \, FR = 1 - \frac{\Delta P_{measured}}{\Delta P_{water}}$$

wherein $\Delta P_{water}$ is the calculated pressure drop for the water and $\Delta P_{measured}$ is the measured pressure drop after introduction of the solution containing FDP-S848-07.

Figure 3:
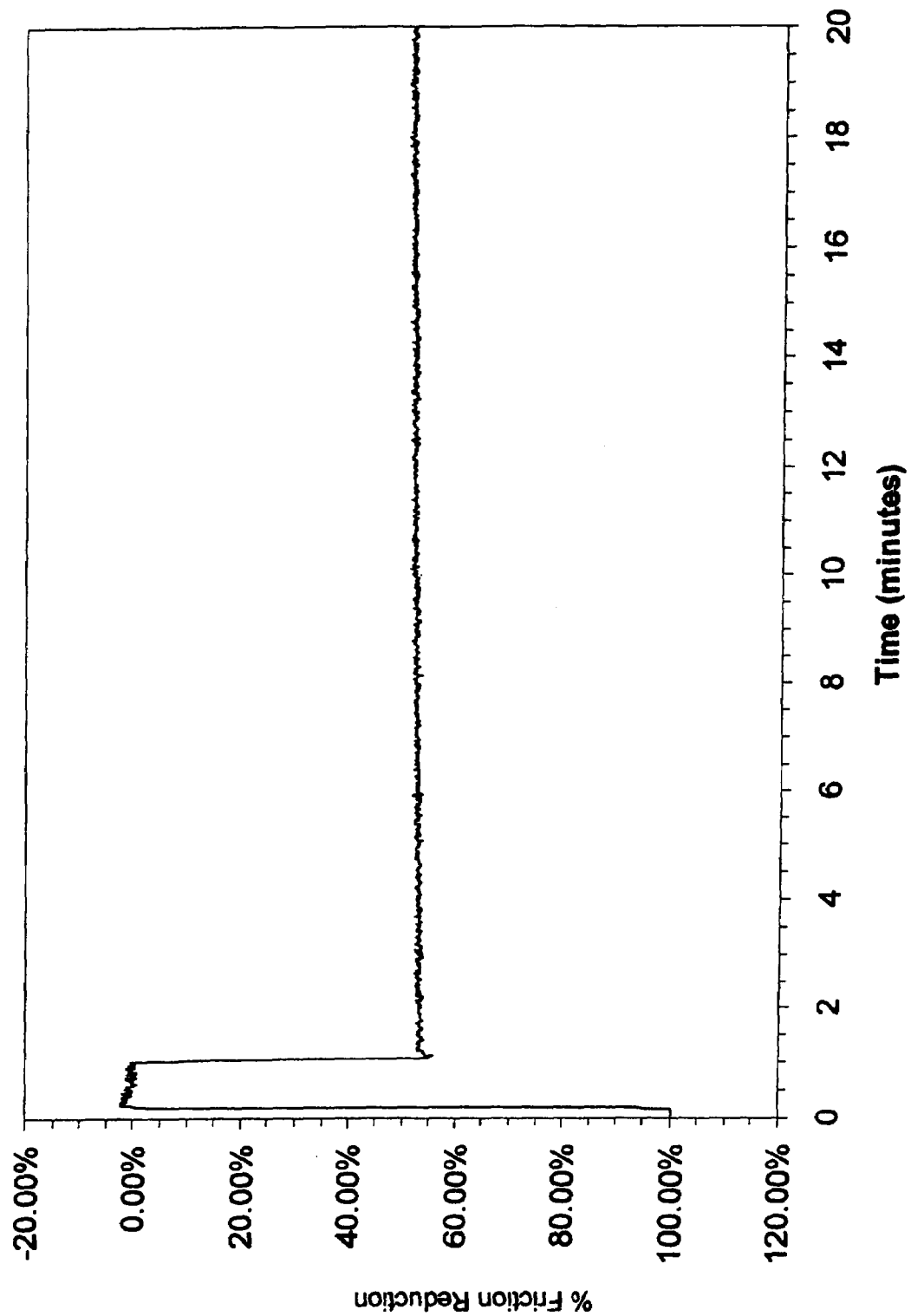
FIG. 3 illustrates the friction reduction properties of a treatment fluid of the present invention.

The results of this test plotting % Friction Reduction versus time are shown in FIG. 3. During the first 10 to 15 seconds, data was collected with the pump off. Afterwards, the pump was turned on, and data was collected on Duncan tap water. Here % Friction Reduction should be approximately zero as $\Delta P_{measured}$ should equal $\Delta P_{water}$. After one minute, the solution containing FDP-S848-07 was added, and as a result of the friction reduction properties of FDP-S848-07, % Friction Reduction was measured to be between 50 and 60%.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method comprising:
   providing an acidic treatment fluid that comprises a base fluid, an acid composition, and a gelling agent that comprises clarified diutan;
   wherein the acid composition comprises an acid selected from the group consisting of: carbonic acid, glycolic acid, lactic acid, hydroxyethyl ethylenediamine triacetic acid, hydrofluoric acid, p-toluenesulfonic acid, and a combination thereof; and,
   introducing the acidic treatment fluid into at least a portion of a subterranean formation.

2. The method of claim 1 wherein the clarified diutan has a transmittance at 600 nm wavelength of at least about 65% in a 1 centimeter optical cell, at 0.1% concentration in deionized water.

3. The method of claim 1 wherein the clarified diutan has a transmittance at 350 nm wavelength of at least about 20% in a 1 centimeter optical cell, at 0.1% concentration in deionized water.

4. The method of claim 1 wherein the clarified diutan in an amount of 42 lbs/Mgal in a sodium bromide brine having a density of 11.5 pounds per gallon (ppg) has a fluid loss greater than about 30 grams in 5 minutes at ambient temperature in a filtering laboratory test on a Baroid Filter Press using 40 psi of differential pressure and a 11 cm Whatman #50 filter paper having a 2.7 μ pore size.

5. The method of claim 1 wherein the clarified diutan in an amount of 42 lbs/Mgal in a sodium bromide brine having a density of 11.5 pounds per gallon (ppg) has a fluid loss greater than about 145 grams in 5 minutes at ambient temperature in a filtering laboratory test on a Baroid Filter Press using 40 psi of differential pressure and a 11 cm Whatman #2 filter paper having a 8 μ pore size.

6. The method of claim 1 wherein the clarified diutan in an amount of 42 lbs/Mgal in a sodium bromide brine having a density of 11.5 pounds per gallon (ppg) has a fluid loss greater than about 115 grams in 2.5 minutes at ambient temperature in a filtering laboratory test on a Baroid Filter Press using 40 psi of differential pressure and a 11 cm Whatman #2 filter paper having a 8 μ pore size.

7. The method of claim 1 wherein the gelling agent is present in the acidic treatment fluid in an amount in the range of from about 0.25 lbs/Mgal to about 200 lbs/Mgal.

8. The method of claim 1 wherein the acidic treatment fluid further comprises an additive chosen from the group consisting of: a brine, a salt, a pH control additive, a surfactant, a breaker, a bactericide, a crosslinker, a fluid loss control additive, a stabilizer, a chelant, a scale inhibitor, a corrosion inhibitor, a hydrate inhibitor, a clay stabilizer, a salt substitute, a relative permeability modifier, a sulfide scavenger, fibers, nanoparticles, and combinations thereof.

9. The method of claim 1 further comprising introducing the acidic treatment fluid into at least a portion of a subterranean formation at apressure sufficient to create or enhance at least one fracture in the subterranean formation.

10. The method of claim 1 wherein the treatment fluid is placed in the subterranean formation with a hydrajet tool.

11. A method comprising:
providing an acidic treatment fluid that comprises a base fluid, an acid composition, and a gelling agent that comprises clarified diutan;
wherein the acid composition comprises an acid selected from the group consisting of: carbonic acid, glycolic acid, lactic acid, hydroxyethyl ethylenediamine triacetic acid, hydrofluoric acid, p-toluenesulfonic acid, and a combination thereof; and,
contacting a portion of a subterranean formation with the acidic treatment fluid at a pressure sufficient to create or enhance at least one fracture in the subterranean formation; and,
allowing the acidic treatment fluid to interact with a component of the subterranean formation so that the component is at least partially dissolved.

12. The method of claim 11 wherein the clarified diutan has a transmittance at 600 nm wavelength of at least about 65% in a 1 centimeter optical cell, at 0.1% concentration in deionized water.

13. The method of claim 11 wherein the clarified diutan has a transmittance at 350 nm wavelength of at least about 20% in a 1 centimeter optical cell, at 0.1% concentration in deionized water.

14. The method of claim 11 wherein the clarified diutan in an amount of 42 lbs/Mgal in a sodium bromide brine having a density of 11.5 pounds per gallon (ppg) has a fluid loss greater than about 30 grams in 5 minutes at ambient temperature in a filtering laboratory test on a Baroid Filter Press using 40 psi of differential pressure and a 11 cm Whatman #50 filter paper having a 2.7 μ pore size.

15. The method of claim 11 wherein the clarified diutan in an amount of 42 lbs/Mgal in a sodium bromide brine having a density of 11.5 pounds per gallon (ppg) has a fluid loss greater than about 145 grams in 5 minutes at ambient temperature in a filtering laboratory test on a Baroid Filter Press using 40 psi of differential pressure and a 11 cm Whatman #2 filter paper having a 8 μ pore size.

16. The method of claim 11 wherein the clarified diutan in an amount of 42 lbs/Mgal in a sodium bromide brine having a density of 11.5 pounds per gallon (ppg) has a fluid loss greater than about 115 grams in 2.5 minutes at ambient temperature in a filtering laboratory test on a Baroid Filter Press using 40 psi of differential pressure and a 11 cm Whatman #2 filter paper having a 8 μ pore size.

17. The method of claim 11 wherein the gelling agent is present in the treatment fluid in an amount in the range of from about 0.25 lbs/Mgal to about 200 lbs /Mgal.

18. The method of claim 11 wherein the acidic treatment fluid further comprises an additive chosen from the group consisting of: a brine, a salt, a pH control additive, a surfactant, a breaker, a bactericide, a crosslinker, a fluid loss control additive, a stabilizer, a chelant, a scale inhibitor, a corrosion inhibitor, a hydrate inhibitor, a clay stabilizer, a salt substitute, a relative permeability modifier, a sulfide scavenger, fibers, nanoparticles, and combinations thereof.

19. A method comprising:
providing an acidic treatment fluid that comprises a base fluid, an acid composition, and a gelling agent that comprises clarified diutan;
wherein the acid composition comprises an acid selected from the group consisting of: carbonic acid, glycolic acid, lactic acid, hydroxyethyl ethylenediamine triacetic acid, hydrofluoric acid, p-toluenesulfonic acid, and a combination thereof; and,
introducing the treatment fluid into a pipeline.

20. The method of claim 19 wherein the clarified diutan has a transmittance at 600 nm wavelength of at least about 65% in a 1 centimeter optical cell, at 0.1% concentration in deionized water.

21. The method of claim 19 wherein the gelling agent is present in the treatment fluid in an amount in the range of from about 0.25 lbs/Mgal to about 200 lbs/Mgal.

22. The composition of claim 1 wherein the treatment fluid further comprises particulates.

23. The composition of claim 22 wherein the particulates are at least partially coated with a resin or a tackifying agent.

24. The composition of claim 1 wherein the acidic treatment fluid is an aqueous-external emulsion further comprising a hydrocarbon fluid and an emulsifying surfactant.

25. The composition of claim 11 wherein the treatment fluid further comprises particulates.

26. The composition of claim 25 wherein the particulates are at least partially coated with a resin or a tackifying agent.

27. The composition of claim 11 wherein the acidic treatment fluid is an aqueous-external emulsion further comprising a hydrocarbon fluid and an emulsifying surfactant.

28. The composition of claim 19 wherein the treatment fluid further comprises particulates.

29. The composition of claim 28 wherein the particulates are at least partially coated with a resin or a tackifying agent.

* * * * *